Aug. 21, 1956 A. E. TOBEY 2,759,508
WHEEL SUPPORTING APPARATUS
Filed March 31, 1953
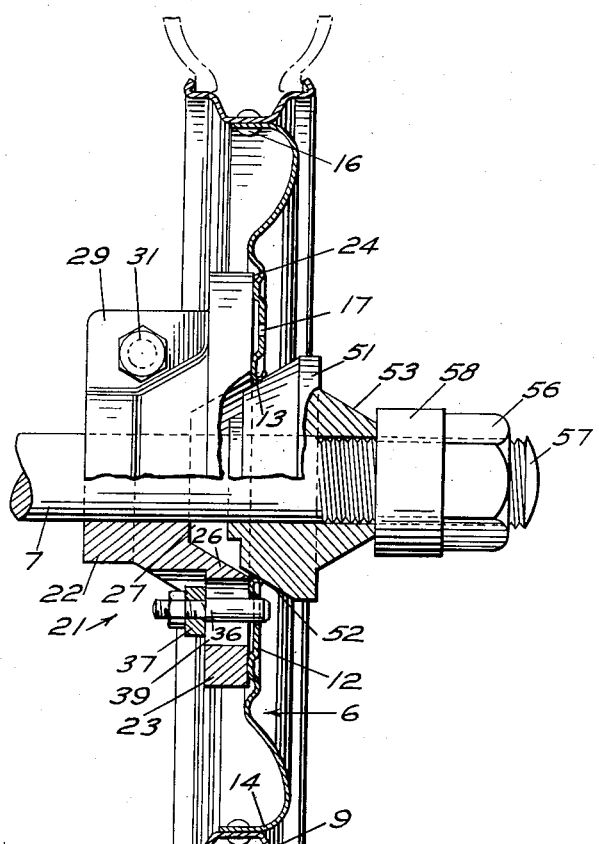
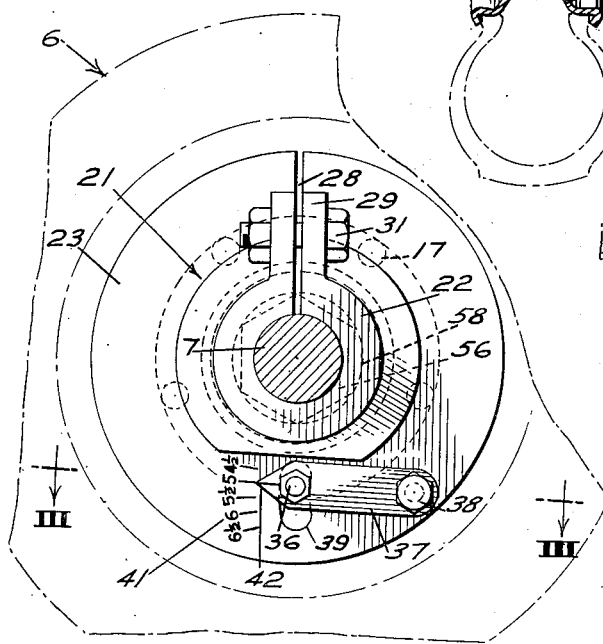
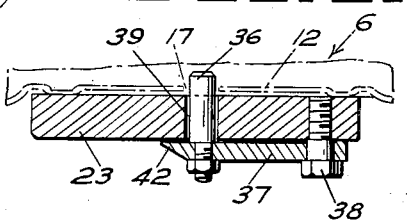
INVENTOR.
ALTON E. TOBEY
BY
ATTORNEYS United States Patent Office 2,759,508
Patented Aug. 21, 1956

2,759,508
WHEEL SUPPORTING APPARATUS

Alton E. Tobey, Santa Cruz, Calif.

Application March 31, 1953, Serial No. 345,806

1 Claim. (Cl. 144—288)

This invention relates to devices for supporting wheels whereby the wheel and the tire carried thereon may be rotated for buffing, trimming or other operations on such tire, and more particularly to improved lock means for securing a wheel and tire to a rotatable shaft.

An object of the present invention is to provide apparatus whereby a vehicle wheel, with the tire mounted thereon, may be simply and rapidly secured to or removed from a rotatable shaft whereby the outer portions of said tire may be trimmed, buffed or otherwise operated on.

Another object of my invention is to provide apparatus of the character described in which means are provided for supporting tires covering a wide range of sizes without requiring removal of the tires from their respective wheels.

A further object of the invention is to provide apparatus of the above type in which a wide range of wheel sizes may be positively locked to a shaft for rotation with the latter.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Referring to said drawing:

Figure 1 is a side elevational view, partly in section, of the apparatus of my invention, shown with a wheel in operative position thereon.

Figure 2 is an end elevational view of the apparatus disclosed in Figure 1.

Figure 3 is a cross-sectional view taken substantially in the plane indicated by line 3—3 of Figure 2.

The apparatus of my invention is designed for releasably securing a vehicle wheel 6 to a shaft 7 whereby upon rotation of the shaft by any suitable means (not shown), the wheel 6 and a tire 8, conventionally mounted on the wheel rim 9, may be likewise rotated. In this manner, by applying a trimming or other tool to the tire, the latter may be operated on without requiring the removal of the tire from the wheel, and thus eliminate the relatively costly apparatus currently utilized for supporting and rotating tires independently of their wheels.

As is well known in the art, a vehicle wheel, such as wheel 6, includes an annular disk-like portion 12 which encompasses a relatively large central opening 13, such opening being arranged to encircle the vehicle axle when the wheel is mounted on the vehicle. The outer peripheral portions of the wheel are generally curvate in cross-sectional form, as indicated by the numeral 14, and rivets 16, or other suitable attaching means, are utilized for interconnecting the wheel disk to the peripherally extending tire-supporting rim 9. Wheel disks are further provided with a plurality of circumferentially spaced apertures 17, these apertures being arranged to slidably receive the wheel mounting studs of the vehicle. Just as there is a wide range of tire and wheel diameters and widths, there is also a corresponding variation in the size of disk opening 13 and the diametrical spacing of the stud mounting holes 17. In view of the fact that these features are relied upon in the present invention for mounting and rotating the wheel, adjustable or variable lock and drive means must be utilized in my apparatus.

With particular reference to Figures 1 and 2 of the drawing, it will be seen that my improved apparatus includes a backing member, generally indicated by the numeral 21, such member having an annular hub portion 22 encircling shaft 7 and an annular flange 23, a transaxial face 24 thereof being arranged to engage the confronting surface of the disk 12 of the mounted wheel. A generally frusto-conical portion 26 of the backing member interconnects hub portion 22 and flange 23 thereby leaving a recess 27 between shaft 7 and flange 23 for a purpose to be hereinafter explained. Although member 21 could be constructed as an integral unit and keyed or otherwise secured to the shaft 7, as here shown, the member is provided with a radial slot 28 and on each side of the slot, a boss 29 is utilized, suitable bolts 31 interconnecting the respective bosses and clamping the member onto shaft 7 for rotation with the latter.

Means are provided on member 21 engageable with wheel disk 12 for insuring rotation of the wheel with the member. If only a single size wheel was to be mounted, it would only be necessary to provide a fixed stud extending from flange 23 and engageable in one of the disk apertures 17. However, as it is contemplated to use the present apparatus for more than a single wheel size, and as various wheel sizes have different radial stud aperture spacing, it will be readily apparent that a fixed stud arrangement would not be adequate. Therefore, as an important feature of my invention, I utilize a drive stud or pin 36 which is capable of simple adjustment to permit its insertion into the apertures 17 of the wheel disk for different wheel sizes. This is preferably effected by mounting stud 36 on a swinging arm 37, the latter being pivotally mounted on flange 23 by a bolt 38 so that the arm may be tightened in selected positions of rotation. Stud 36 extends through an arcuate slot 39 in member 23, the slot being of a length so as to permit radial movement of the arm a distance sufficient to allow the insertion of the drive pin for all sizes of wheels to be mounted on member 21. If desired, indicia 41 may be placed on member 21 adjacent slot 39, and by providing a pointed extension 42 on arm 37, it will be understood that the proper pivotal position of arm 37 for a particular wheel size may be set prior to the installation of the wheel on the backing member.

With the foregoing construction, it is believed apparent that as the shaft 7 and backing member 21 are rotated, the pin 36, inserted in the wheel disk aperture 17, will impart similar rotation to the wheel as well as to the tire mounted thereon. However, it should be also obvious that this driving means will not prevent axial movement of the wheel on the shaft so as to effect withdrawal of the drive pin.

Such axial movement is preferably prevented by means of a cone member 51 slidably mounted on shaft 7 and provided with a pair of opposed frusto-conical portions 52 and 53, the latter being smaller in radial extent than the former. Each of the portions 52 and 53 are adapted to fit within the frusto-conical portion 26 of the backing member and by having the largest diameter of the latter slightly smaller than the minimum disk opening 13, the inner peripheral portions of disk 12 will always overlap the inner peripheral portions of flange 23, and thereby be in a position to be engaged by one of the cone portions. For example, if the disk opening was smaller than that indicated in Figure 1, cone 51 would be moved axially on shaft 7 away from member 21 for cone portion 52 to fit the inner periphery of the disk. Decreasing the opening still further, it would become necessary to reverse the cone and permit cone portion 53 to effect the interengagement. It should be apparent that unless the design of member 21 was materially altered, a single tapered cone could not be utilized, as there is insufficient room for any great degree of axial movement. But by utilizing the double cone a single unit will accommodate a wide range of sizes of disk openings.

Cone 51 is held against the disk 12 by means of a nut 56 threadedly engaged with a threaded end portion 57 of shaft 7. Preferably, a spacer 58 is interposed between the outer transaxial face of the cone and the opposed transaxial face of the nut to avoid a grinding therebetween upon tightening of the nut.

From the foregoing description, the details of construction, and manner of utilization should be evident. It is believed apparent that wheels of various sizes may be easily placed on and removed from the apparatus in a minimum of time and with little effort. Also, the locking means will insure rotation of the wheel even though considerable resistance is being offered to the tire periphery by a buffer, abrader or other machine.

I claim:

Apparatus of the character described including a hub-like member having an axial bore extending therethrough and an annular flange concentric with said bore, the inner periphery of said flange being radially outwardly disposed from said bore, said flange having an arcuate slot therethrough and extending generally radially therealong, an arm disposed in parallel adjacent relation to an inner face of said flange, means pivotally mounting said arm to said member on an axis perpendicular to said flange face whereby a portion thereof will overlie selective portions of said slot as said arm is moved, said pivotal mounting means being disposed at the center of curvature of said slot, means for locking said arm in selected positions of pivotal movement, and a stud element secured to said arm in perpendicular relation thereto and extending through said flange with a portion thereof protruding beyond the outer face of said flange.

References Cited in the file of this patent
UNITED STATES PATENTS

| | | |
|---|---|---|
| 45,364 | Underhill | Dec. 6, 1864 |
| 1,809,169 | Kennedy | June 9, 1931 |
| 2,075,421 | Bennett | Mar. 30, 1937 |
| 2,134,500 | Bennett | Oct. 25, 1938 |
| 2,178,101 | Hatch | Oct. 31, 1939 |
| 2,481,926 | Henderson | Sept. 13, 1949 |
| 2,505,172 | Coats | Apr. 25, 1950 |
| 2,547,976 | Rockwell | Apr. 10, 1951 |
| 2,598,946 | Teegarden | June 3, 1952 |